United States Patent
Bachrach et al.

(10) Patent No.: US 8,341,984 B2
(45) Date of Patent: Jan. 1, 2013

(54) ESTIMATING VELOCITIES WITH UNCERTAINTY

(75) Inventors: Ran Bachrach, Binyamina (IL); Konstantin Osypov, Houston, TX (US); Colin Michael Sayers, Katy, TX (US)

(73) Assignee: WesternGeco L.L.C., Houston, TX (US)

( * ) Notice: Subject to any disclaimer, the term of this patent is extended or adjusted under 35 U.S.C. 154(b) by 495 days.

(21) Appl. No.: 12/473,020

(22) Filed: May 27, 2009

(65) Prior Publication Data

US 2010/0305865 A1 Dec. 2, 2010

(51) Int. Cl.
*G01V 1/00* (2006.01)
*G01V 1/28* (2006.01)

(52) U.S. Cl. .................. 70/18; 702/11; 702/181

(58) Field of Classification Search ......... 702/11
See application file for complete search history.

(56) References Cited

U.S. PATENT DOCUMENTS

| | | | |
|---|---|---|---|
| 5,416,750 A * | 5/1995 | Doyen et al. | 367/73 |
| 6,549,854 B1 | 4/2003 | Malinverno et al. | |
| 6,636,810 B1 * | 10/2003 | Moore et al. | 702/17 |
| 6,766,254 B1 | 7/2004 | Bradford et al. | |
| 6,826,486 B1 * | 11/2004 | Malinverno | 702/16 |
| 2005/0197780 A1 * | 9/2005 | Moos et al. | 702/14 |
| 2007/0038377 A1 | 2/2007 | Sayers et al. | |
| 2007/0203673 A1 * | 8/2007 | Sherrill et al. | 702/189 |

FOREIGN PATENT DOCUMENTS

WO 2007194977 A2 2/2007

OTHER PUBLICATIONS

R. Gerhard Pratt, Seismic waveform inversion in the frequency domain—I: Theory, and verification in a physical scale model, 1998, 1-39.*
International Search Report, Oct. 18, 2010, PCT/US2010/030532.
Scales, et al., To Bayes or not to Bayes? Geophysics, Jul.-Aug. 1997, pp. 1045-1046, vol. 62, No. 4.
Doyen, et al. Seismic Pore Pressure Prediction with uncertainty using a Probabilistic Mechanical Earth Model, SEG Expanded Abstracts, 2003, vol. 22.
Malinverno, et al., Integrating Diverse Measurements to Predict Pore Pressure with Uncertainties while Drilling, SPE Annual Technical Conference and Exhibition, Sep. 2004.
Malinverno, et al., Two Ways to Quantify Uncertainty in Geophysical Inverse Problems, Geophysics, May-Jun. 2006, pp. W15-W27, vol. 71, No. 3.
Sayers, et al., Well-Constrained Seismic Estimation of Pore Pressure with Uncertainty, The Leading Edge, Dec. 2006, pp. 1524-1526.

* cited by examiner

*Primary Examiner* — Sujoy Kundu
*Assistant Examiner* — Michael Dalbo

(57) ABSTRACT

A method and apparatus for estimating velocity in a subsurface region. Seismic data for a subsurface region may be received. One or more attributes for the seismic data may be calculated. A posterior distribution may be generated. The posterior distribution may represent one or more probabilities of one or more velocities for the attributes. A velocity with uncertainty may be determined for the subsurface region based on the posterior distribution. A pore pressure with uncertainty may be determined based on the velocity with uncertainty.

20 Claims, 6 Drawing Sheets

VELOCITIES FOR DEPTH $Z_1$

MOVEOUT VALUES FOR VELOCITY $V_1$

VELOCITIES FOR MOVEOUT VALUE $M_1$

ESTIMATING VELOCITIES WITH UNCERTAINTY

BACKGROUND OF THE INVENTION

1. Field of the Invention

Implementations of various technologies described herein generally relate to methods and systems for estimating velocities with uncertainty.

2. Description of the Related Art

The following descriptions and examples are not admitted to be prior art by virtue of their inclusion within this section.

When drilling a well, a fluid is inserted into a well-bore to maintain the integrity of the well-bore wall. If the pressure of the fluid in the well-bore is lower than the pore pressure (the pressure of the fluids in the formation surrounding the well), the fluids in the formation could enter the well-bore.

The fluid inserted into the well-bore to maintain the integrity of the well-bore wall is known as a mud. The mud is a fluid with suspended particles. A mud-weight is the amount of pressure that the mud applies to the well-bore wall. To prevent a kick, the driller uses an appropriate mud-weight. A kick is a collapse of the well-bore wall due to fluids with a pore pressure greater than the pressure within the well-bore. In one such scenario, flammable liquids, such as gas, could enter the well-bore and ignite.

Typically, the pore pressure increases as the well-bore is dug. Accordingly, the mud weight may be increased. However, the mud weight may not exceed a minimum stress of the well-bore. The minimum stress is an amount of pressure against the well-bore wall that may induce fractures in the surrounding formation. A fracture may lead to the loss of drilling fluid, which is very costly.

An increase in mud pressure increases the pressure along the entire length of the well-bore wall. If the mud pressure is higher than the minimum stress in a more shallow part of the well-bore, the well-bore wall may fracture. As such, a range of pressure is maintained within the well-bore that is greater than the pore pressure but less than the minimum stress. The pore pressure and the minimum stress provide a mud-weight pressure window, and this window may be used to decide the depth of casing points.

The casing points are depths within the well-bore where casing shoes are inserted. For example, when the pore pressure at a lower well-bore depth exceeds the minimum stress at a more shallow depth, a casing shoe may be inserted to protect the integrity of the well-bore wall at the more shallow depth.

The casing shoes are steel tubes that are cemented into place to protect the integrity of the well. Once the casing shoe is inserted, the mud-weight may be increased at the lower depth without inducing fractures at the more shallow depth. The casing shoes are very expensive and are typically ordered ahead of time due to the logistics involved in planning and digging wells.

SUMMARY

Described herein are implementations of various technologies for estimating velocity in a subsurface region. Seismic data for a subsurface region may be received. One or more attributes for the seismic data may be calculated. A posterior distribution may be generated. The posterior distribution may represent one or more probabilities of one or more velocities for the attributes. A velocity with uncertainty may be determined for the subsurface region based on the posterior distribution. A pore pressure with uncertainty may be determined based on the velocity with uncertainty.

In one implementation, a moveout may be calculated for the seismic data. In such an implementation, the posterior distribution may represent one or more probabilities of the velocities for the moveout. Additionally, a minimum stress with uncertainty may be determined. The minimum stress with uncertainty may be based on the velocity with uncertainty.

In another implementation, a waveform inversion may be performed for the seismic data. In such an implementation, the posterior distribution may represent the probabilities of the velocities for the waveform inversion. Additionally, a well may be designed based on the pore pressure with uncertainty and the minimum stress with uncertainty.

The claimed subject matter is not limited to implementations that solve any or all of the noted disadvantages. Further, the summary section is provided to introduce a selection of concepts in a simplified form that are further described below in the detailed description section. The summary section is not intended to identify key features or essential features of the claimed subject matter, nor is it intended to be used to limit the scope of the claimed subject matter.

BRIEF DESCRIPTION OF THE DRAWINGS

Implementations of various technologies will hereafter be described with reference to the accompanying drawings. It should be understood, however, that the accompanying drawings illustrate only the various implementations described herein and are not meant to limit the scope of various technologies described herein.

DETAILED DESCRIPTION

The discussion below is directed to certain specific implementations. It is to be understood that the discussion below is only for the purpose of enabling a person with ordinary skill in the art to make and use any subject matter defined now or later by the patent "claims" found in any issued patent herein.

The following paragraph provides a brief summary of various techniques described herein. In general, various techniques described herein are directed to a method for estimating uncertainty in velocity predictions.

One or more implementations of various techniques for estimating velocities with uncertainty will now be described in more detail with reference to FIGS. 1-6 in the following paragraphs.

Figure 1:
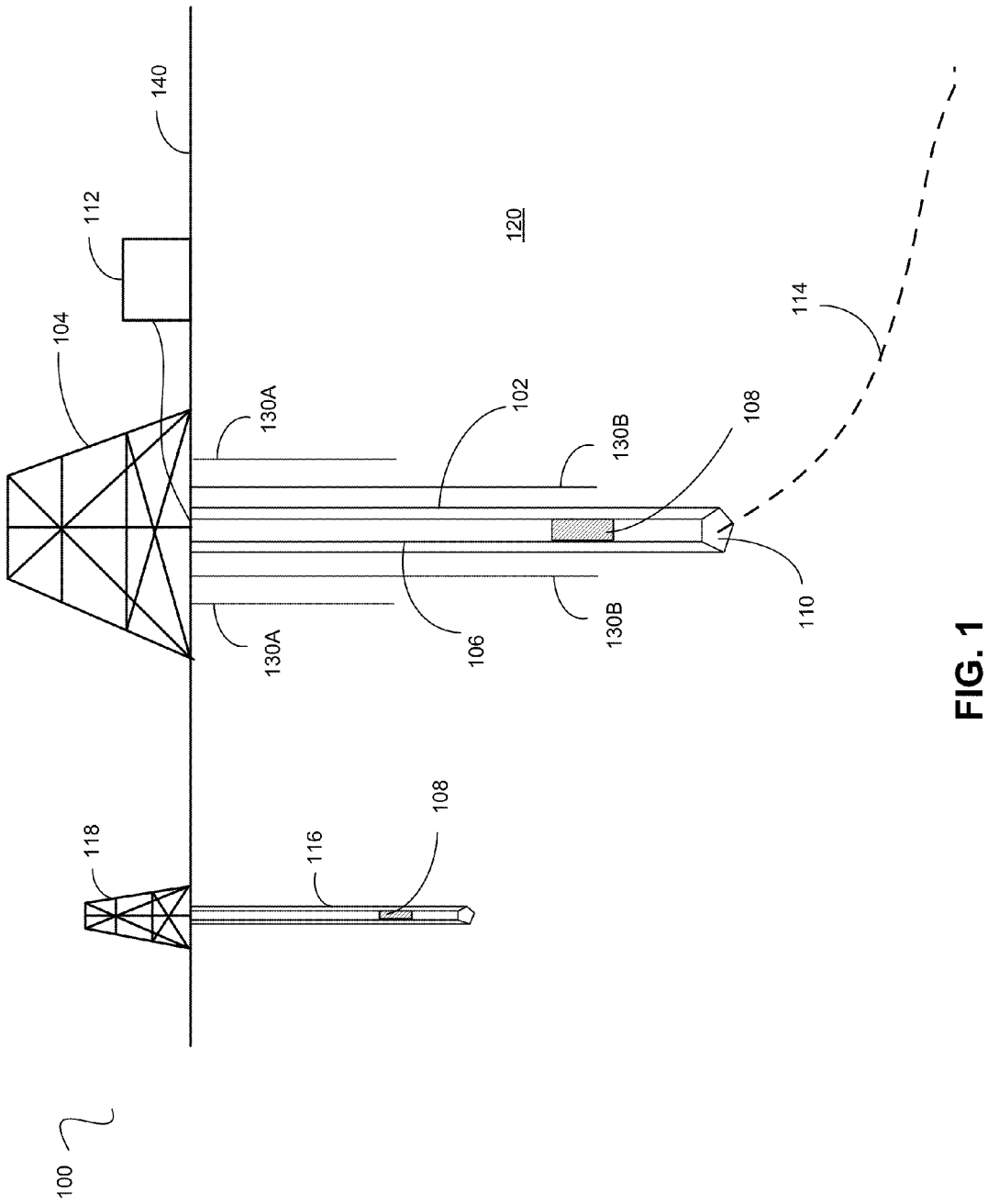
FIG. 1 illustrates a schematic diagram of a drilling operation for the construction of a well-bore in accordance with one or more implementations of various techniques described herein.

FIG. 1 illustrates a schematic diagram of a drilling operation 100 for the construction of a well-bore 102 in accordance with one or more implementations of various techniques described herein. A rig 104, located at the surface, may be used to support the drilling operation 100. A drill bit 110, connected to the rig 104, may be used to drill the well-bore 102 into a subsurface 120. The drill bit 110 may be located at the bottom of the well-bore 102, connected to the rig 104 via a drill string 106.

The drilling operation 100 may also include an offset well 116, along with rig 118. The offset well 116 may be used to take measurements of seismic data about the subsurface 120.

A tool 108 that is capable of making measurements during the drilling operation may be disposed within the well-bore 102 and the offset well 116. In one implementation, the tool 108 may be a logging-while drilling (LWD) tool. In another implementation, the tool 108 may be a measurement-while drilling (MWD) tool.

The dashed line 114 shows a planned well-bore trajectory. As is shown, the well-bore 102 may be drilled on land. However, it should be noted that implementations of the various techniques described herein may also be applicable to offshore drilling operations.

A control station 112 may contain one or more computers that receive measurements from the tool 108 and the offset well 116. The computers may then be used to estimate velocities with uncertainty for the subsurface 120. It should be noted that while the control station 112 is shown to be located near the well-bore 102, the control station 112 may be located at a remote location (not shown). Alternatively, some portions of the control station 112 may be located remotely while other portions are located near the well-bore 102. The control station 112 is described in greater detail with reference to FIG. 6.

The integrity of the well-bore 102 may be protected by casing shoes 130A, 130B. As stated previously, as the mud weight is increased to counter an increasing pore pressure in the well-bore 102, casing shoes 130A, 130B may be cemented into place to prevent fracturing of the formation surrounding the well-bore 102.

As is shown, the casing shoes 130A, 130B may be set at depths defined on the basis of the estimated pore pressure and the minimum stress. For safe and cost-effective drilling, it is useful to have a method to estimate pore pressure and minimum stress before drilling. Additionally, these estimates may be updated as the well-bore 102 is being drilled and new information is acquired.

Typically, estimates of the pore pressure and the minimum stress can be obtained from information on the variation in compressional wave velocities in the subsurface 120. In implementations of the various techniques described herein, a prediction of the velocities may be derived with uncertainty. The uncertainty may then be estimated based on information acquired before, and during, the drilling.

In turn, the pore pressure and minimum stress may be estimated, also with uncertainty. Advantageously, by estimating the uncertainty of the velocity prediction, the uncertainty for the pore pressure and the minimum stress estimations may be reduced. The velocity prediction and the uncertainty estimation are described in greater detail with reference to FIG. 2.

Figure 2:
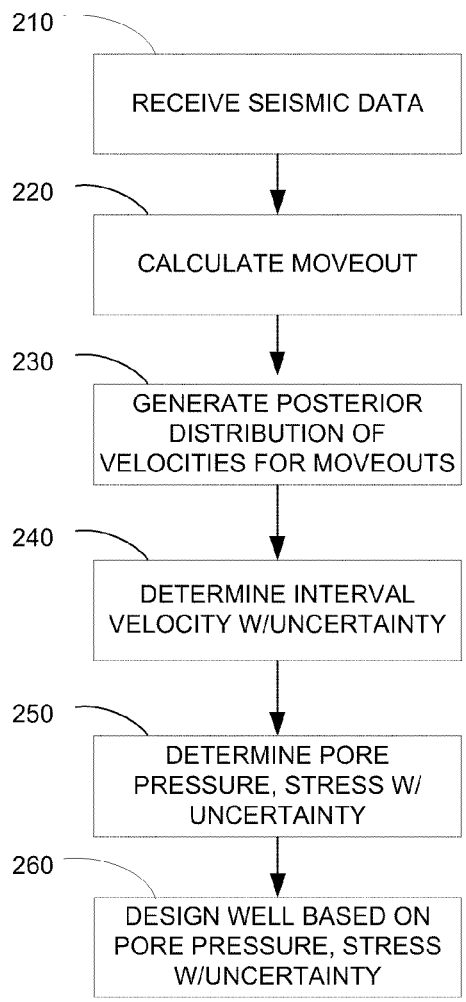
FIG. 2 illustrates a flow chart of a method for estimating velocities with uncertainty in accordance with implementations of various techniques described herein.

FIG. 2 illustrates a flow chart of a method 200 for estimating velocities with uncertainty in accordance with implementations of various techniques described herein. It should be understood that while the flow chart indicates a particular order of execution of the operations, in some implementations, certain steps of the method 200 may be executed in a different order.

At step 210, seismic data may be received at the control station 112. At step 220, the moveout may be calculated for the seismic data. The moveout is a difference in travel time that is a function of the offset.

The moveout may be used to derive a prediction of the velocities. In another implementation, velocity predictions may instead be derived using other attributes of the seismic data, such as waveform inversion. For example, a waveform inversion may invert the whole observed seismic wavefield in the seismic data directly to a velocity model. In such an implementation, the waveform inversion may be performed using full waveform inversion or waveform tomography.

As stated previously, the predicted velocities may contain some uncertainty. The uncertainty of the predicted velocities may be represented as a probability distribution. The probability distribution may quantify how likely different values of velocity may be in light of the measured moveouts. Accordingly, at step 230, a posterior distribution function, P(v|m), of velocities may be generated for potential moveouts. The step 230 is described in greater detail with reference to FIG. 3.

At step 240, the interval velocity with uncertainty may be determined. The interval velocity with uncertainty may be determined based on the moveout calculated at step 220, and the P(v|m) generated at step 230. In one implementation, the interval velocity with uncertainty may be determined using analytical methods, such as, the Monte Carlo method.

At step 250, the pore pressure and minimum stress may be estimated with uncertainty based on the interval velocities with uncertainty. For example, methods for pore-pressure prediction start from Terzaghi's effective stress principle, which states that all effects of stress on measurable quantities (such as compressional-wave velocities) are a function of the effective pressure, $$P_{eff}(z) = P_{over}(z) - P_{pore}(z), \quad \text{EQUATION 1}$$

where $P_{eff}(z)$ is the effective pressure at depth z, $P_{pore}(Z)$ is the pore pressure at depth z, and $P_{over}(z)$ is the pressure due to the overburden at depth z. Further, $$P_{over}(z) = g \int \rho(z') dz', \quad \text{EQUATION 2}$$

where g is the acceleration of gravity, $\rho(z)$ is bulk density, and the integration is carried out from the surface to depth z. Pore pressure may be estimated using Eaton's equation, $$P_{pore}(z) = P_{over}(z) - [P_{over}(z) - P_{norm}(z)] * \left[\frac{V(z)}{V_{norm}(z)}\right]^n, \quad \text{EQUATION 3}$$

where $P_{norm}(z)$ is the normal (hydrostatic) pore pressure, V(z) is the compressional-wave velocity, and $V_{norm}(Z)$ is the normal value of velocity expected when there are no overpressures. Eaton originally suggested that the exponent, n, should be around 3. However, Bowers noted that if overpressures are the result of mechanisms other than under-compaction, the appropriate value of n should be higher (up to, approximately, 5).

Similar to the velocity prediction, the pore pressure estimation may not be exact because the necessary inputs, such as, velocity, may not be accurately known. To quantify and propagate uncertainties in the pore-pressure estimate, a Bayesian approach may be used. The final output of this approach is not a best estimate of the pore-pressure but rather a probability distribution that quantifies how likely different values of pore pressure are in light of all available information.

More specifically, the posterior probability distribution for the pore-pressure estimation may be derived from Bayes' rule as:

$$p(V, \rho, c_{pore}|d_1, d_1, \ldots, d_N),$$

where V and ρ are compressional-wave velocity and density. In practice, V and ρ may be vectors of velocity and density values in a finely layered medium. The value, $c_{pore}$, may be a vector of uncertain coefficients needed in Eaton's equation. Further, $d_1, d_2 \ldots d_N$ are N vectors of measurements acquired while drilling.

The measurement vectors $d_1, d_2 \ldots d_{N-1}$ contain well logging and checkshot data measured by borehole seismics. A checkshot is a set of travel times of compressional waves between the surface and different depths in the well, and can be obtained while drilling using drill-bit noise or with an LWD measurement. The vector $d_N$ may contain measurements related to pore pressure, such as, mud weights or direct measurements of pore pressure.

At step 260, a well may be designed based on the pore pressure and minimum stress estimates derived at step 250.

Figure 3:
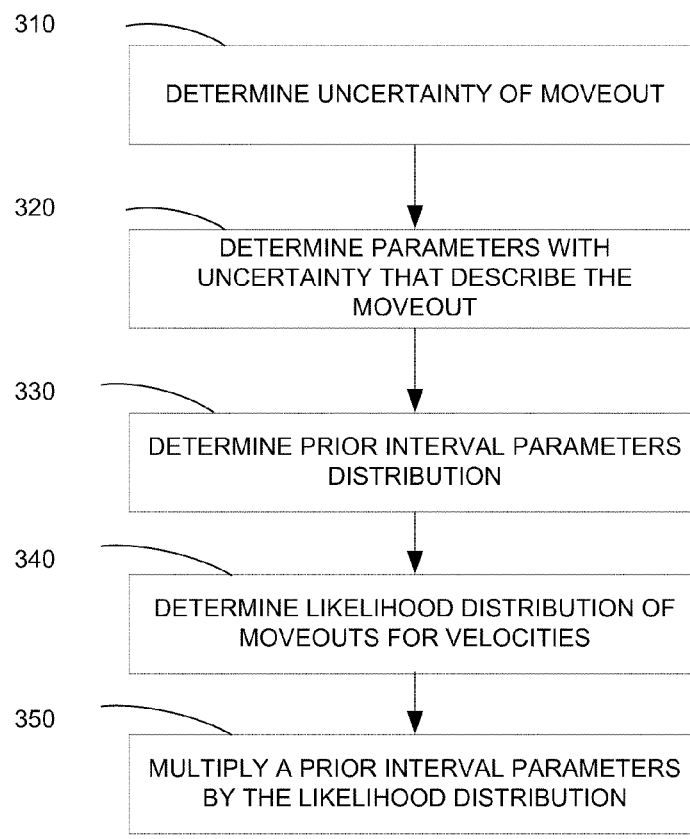
FIG. 3 illustrates a step for determining the posterior distribution function, $P(v|m)$, in accordance with implementation of various techniques described herein.

FIG. 3 illustrates step 230 for determining the posterior distribution function, P(v|m), in accordance with implementation of various techniques described herein. It should be understood that while the flow chart indicates a particular order of execution of the operations, in some implementations, certain operations of the flow chart may be executed in a different order.

At step 310, the uncertainty of the moveout may be determined. Because the velocity prediction may be derived from the moveout, determining the uncertainty of the moveout may be useful. In one implementation, the uncertainty of the moveout may be derived from a semblance analysis. The semblance analysis may differ between a single azimuth, and multiple azimuths. For a single azimuth, semblance may be defined as, $$\frac{\int_{t_0-T/2}^{t_0+T/2} \left[ \int_{x_{min}}^{x_{max}} U(x,t)\,dx \right] dt}{\int_{t_0-T/2}^{t_0+T/2} \int_{x_{min}}^{x_{max}} (U(x,t))^2 \, dx\, dt}, \qquad \text{EQUATION 4}$$

For multiple azimuths, the semblance may be defined as, $$\frac{\int_{t_0-T/2}^{t_0+T/2} \left[ \int_{x_{min}}^{x_{max}} \int_{\phi_{min}}^{\phi_{max}} U(x,\phi,t)\,d\phi\,dx \right] dt}{\int_{t_0-T/2}^{t_0+T/2} \int_{x_{min}}^{x_{max}} \int_{\phi_{min}}^{\phi_{max}} (U(x,\phi,t))^2 \, d\phi\, dx\, dt}, \qquad \text{EQUATION 5}$$

where t is the moveout, x is the offset, U is the recorded wavefield (seismic data) at the subsurface image point (CIP) and φ is the azimuth associated with the seismic scattering from the CIP.

At step 320, the parameters with uncertainty that describe the moveout may be determined. The parameters may be velocity (tomographic or RMS), anisotropy, and zero offset time. An equation, containing the parameters, may be determined that represents the moveout. In another implementation, numerical methods that use the parameters, may be determined that represent the moveout.

For example, the moveout equation may be used. Alternately, the following equation may be used for azimuthally varying parameters, $$t^2(x,\phi) = \qquad \text{EQUATION 6}$$
$$t_0^2 + \frac{x^2}{V_{nmo}^2(\phi)} - \frac{2\hat{\eta}(\phi) x^4}{V_{nmo}^2(\phi)(t_0^2 V_{nmo}^2(\phi) + (1 + 2\hat{\eta}(\phi)) x^2)}$$

where $V_{nmo}$ is the root mean square average (RMS) of the interval nmo velocity and η is an effective high order moveout parameter, which is related to the interval velocity anisotropy.

In another implementation, a general path integral over the slowness, S, from ray tracing may also be used. For example, $$t = \int_{Source}^{Reciever} S(x,\phi)\,dl \qquad \text{EQUATION 7}$$

At step 330, the prior interval parameters distribution may be determined. The parameters may include interval velocity, anisotropy, and zero offset. Given modeling data from surrounding wells, such as, the offset well 116, a prior probability distribution, P(v|z), may be determined. P(v|z) may be a distribution of probabilities for interval velocities, v, at a depth z. In one implementation, the prior interval parameters distribution may be determined by combining the moveouts of 2 different reflectors.

Figure 4:
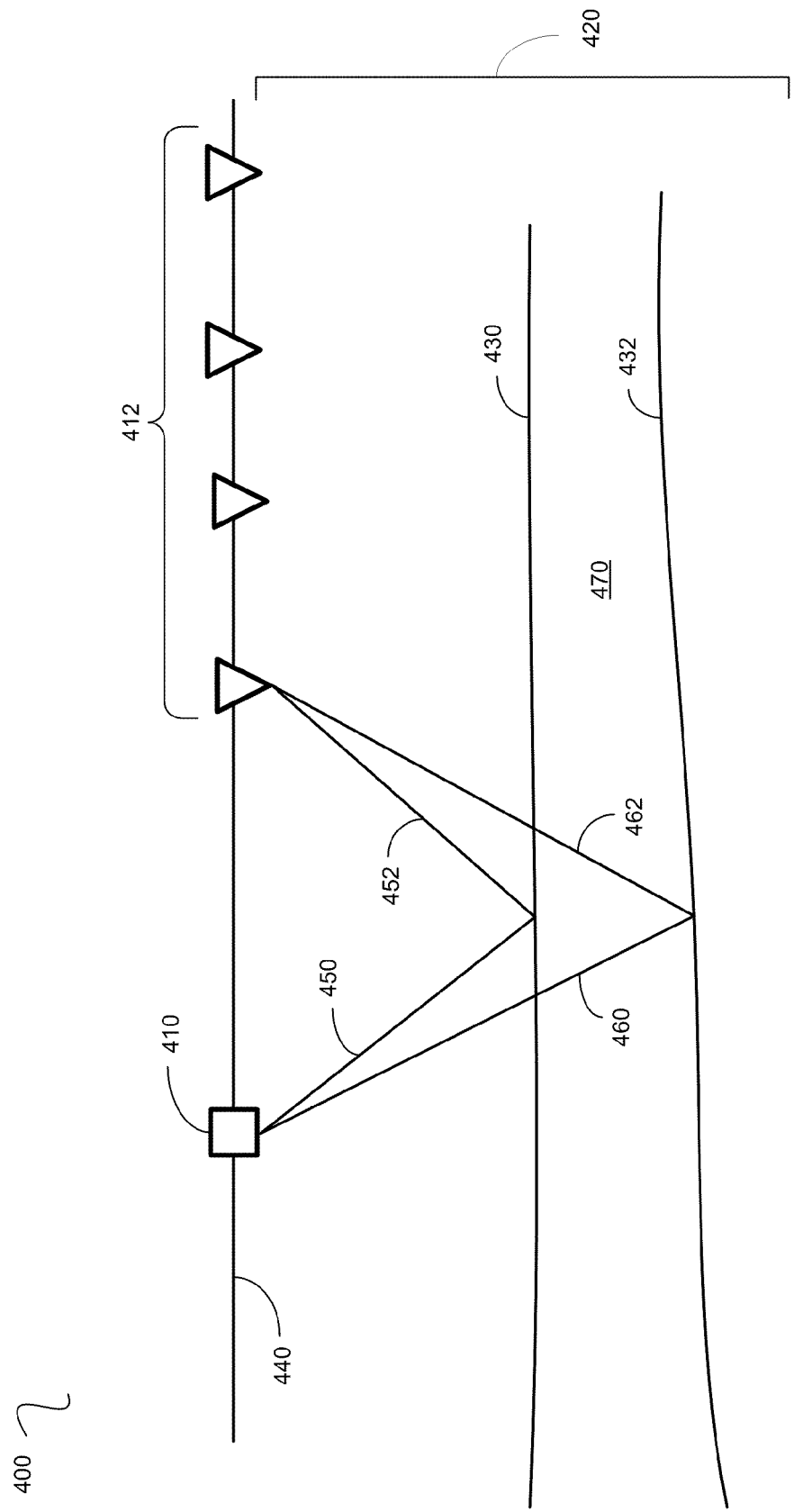
FIG. 4 illustrates a seismic survey system in accordance with implementations of various techniques described herein.

FIG. 4 illustrates a seismic survey system 400 in accordance with implementations of various techniques described herein. The seismic survey system 400 may be used to conduct a survey of the subsurface 420 where the drilling operation 100 takes place.

The seismic survey system 400 may include a source 410 and receivers 412, which may be connected to the control station 112 (shown in FIG. 1). The seismic source 410 may create seismic waves in the subsurface 420, including the formation 470 between reflectors 430, 432. A portion of the seismic waves may travel downward through the subsurface 420. When the seismic waves reach the seismic reflectors 430, 432, a portion of the seismic waves may reflect upward. The receivers 412 may sense the reflected waves that reach the surface 440 and generate representative signals that are communicated to the control station 112. The representative signals are also referred to herein as seismic data, and may include amplitude and travel time.

The amplitude may be an amount of energy contained by the seismic wave as the wave reaches the surface 440. The travel time may be the time between the firing of the source 410 and the arrival of a reflected wave at the receivers 412.

By comparing the moveout for the reflector 430 to the moveout for the reflector 432, it may be possible to determine properties about the formation 470. For example, interval parameters may be determined, with uncertainty, such as velocity. In this manner, a probability distribution may be determined for interval velocities at the depth of the formation 470.

Figure 5:
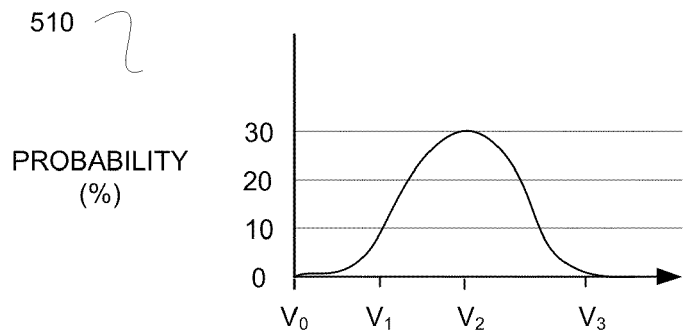
FIG. 5 illustrates an a prior probability distribution, a likelihood distribution, and a posterior distribution in accordance with implementations of various techniques described herein.
Figure 5:
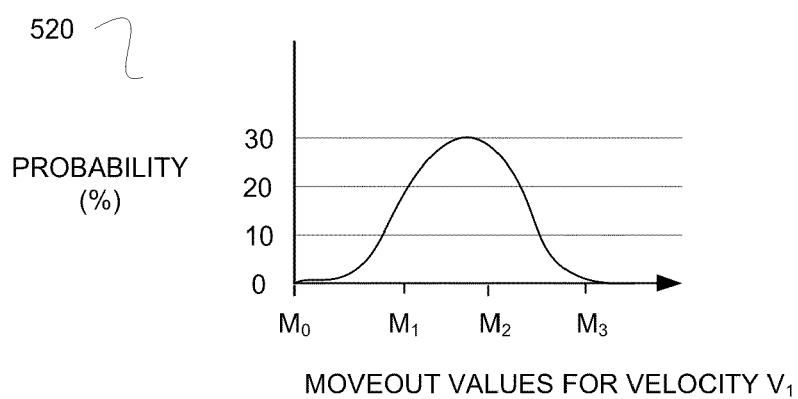
Figure 5:
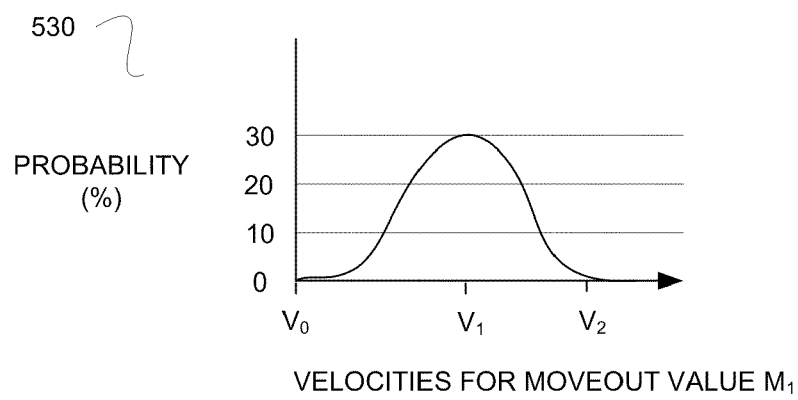

FIG. 5 illustrates an a-priori probability distribution 510, a likelihood distribution 520, and a posterior distribution 530 in accordance with implementations of various techniques described herein. As stated previously, the a prior probability distribution 510 may represent the probabilities for interval velocities ($V_0$-$V_3$) for a given depth, $z_1$, i.e., $P(v|z_1)$. As is shown, the probability is low near velocity, $v_0$, increases as the velocity approaches $v_2$, then decreases again as the velocity approaches $v_3$.

Referring back to FIG. 3, at step 340, a likelihood distribution of moveouts for interval velocities may be determined. The likelihood distribution, P(m|v), may represent the probability of particular moveout values for each of the interval velocities. The likelihood distribution may be determined by calculating moveouts according to the representation of moveout that is determined at step 320. The moveouts may be calculated for the values of the interval parameters, e.g., the velocities of P(v|z).

Referring back to FIG. 5, the likelihood distribution 520 may represent the probability of moveout values ($M_0$-$M_3$) for a velocity, $V_1$. As is shown, the probability is low near a moveout value, $M_0$, increase as the moveout value approaches $M_2$, then decreases again as the moveout value approaches $M_3$.

At step 350, the a prior probability distribution may be multiplied by the likelihood distribution. According to Bayes Theorem, the product may represent the posterior distribution, $P(v|m)$. As stated previously, the posterior distribution, $P(v|m)$, may represent the probability of interval velocities for particular moveouts.

Referring again to FIG. 5, the posterior distribution 530 shows that the probability of the velocity $V_1$ for the moveout value $M_1$ is 10%. Advantageously, by generating the posterior distribution, $P(v|m)$, the range of possible velocities for the depth $Z_1$ may be limited. More specifically, instead of a range of values, such as $V_0$ to $V_3$ shown in $P(v|z)$, the potential velocities may be limited to the range of values shown in $P(v|m)$ for moveout values that are calculated from the recorded seismic data.

In other words, instead of predicted velocities with uncertainty between velocity values between $V_0$ and $V_3$, the predicted velocities have a reduced uncertainty limiting the potential velocity values within the range of $V_0$ and $V_2$.

It should be noted that implementations of the various techniques described herein using a Bayesian approach. The Bayesian approach, or, Bayesian probability interprets the concept of probability as 'a measure of a state of knowledge.' Many modern machine learning methods are based on objectivist view of Bayesian principles.

Alternatively, a frequentist approach could be used. The frequentist approach, or frequency probability, is an interpretation of probability that defines an event's probability as the limit of its relative frequency in a large number of trials.

One of the crucial features of the Bayesian view is that a probability can be assigned to a hypothesis, which is not possible under the frequentist view, where a hypothesis can only be rejected or not rejected.

Figure 6:
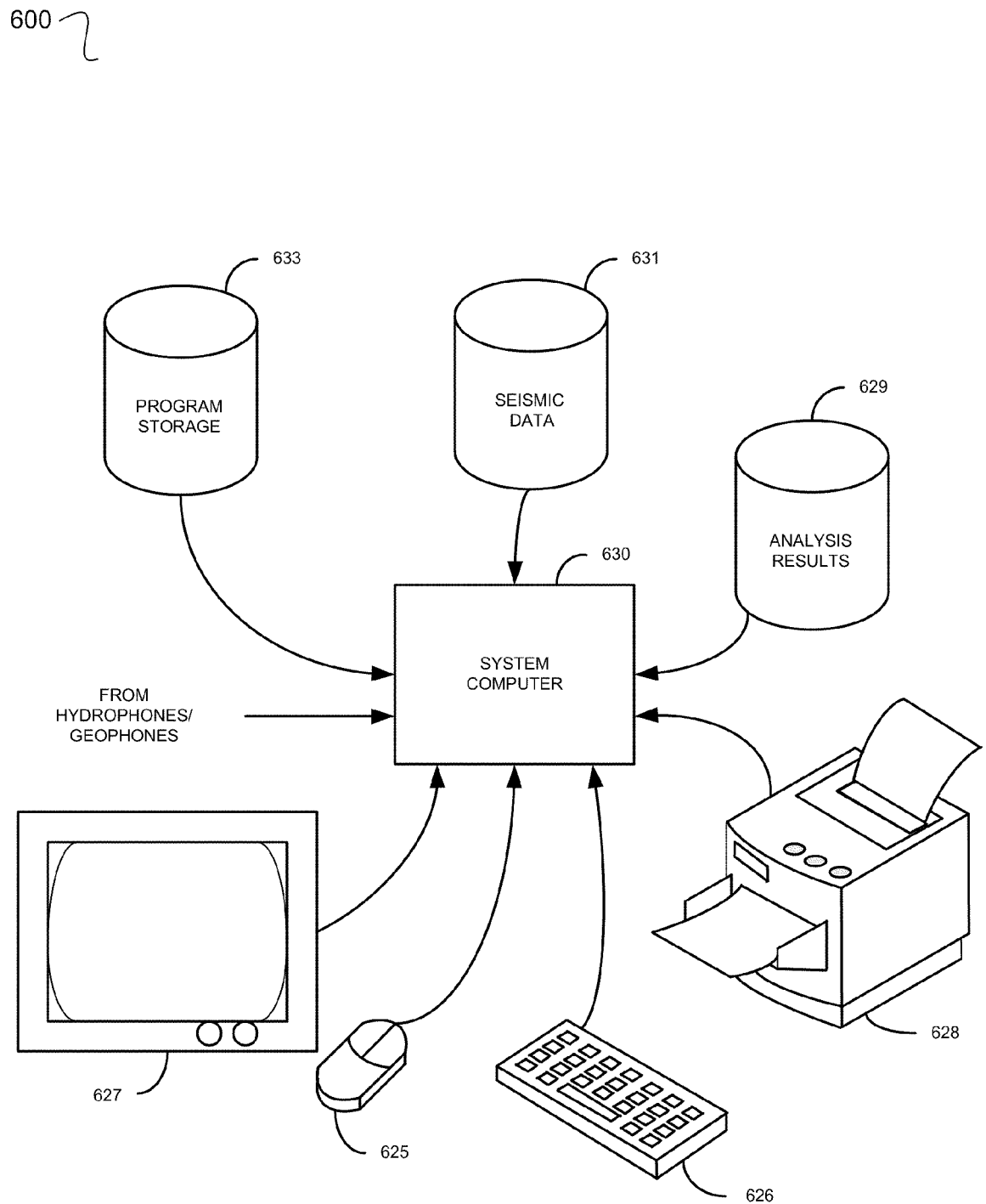
FIG. 6 illustrates a computer network, into which embodiments of the invention may be implemented.

FIG. 6 illustrates a computer network 600, into which embodiments of the invention may be implemented. The computer network 600 includes a system computer 630, which may be implemented as any conventional personal computer or workstation, such as a UNIX-based workstation. The system computer 630 is in communication with disk storage devices 629, 631, and 633, which may be external hard disk storage devices. It is contemplated that disk storage devices 629, 631, and 633 are conventional hard disk drives, and as such, will be implemented by way of a local area network or by remote access. Of course, while disk storage devices 629, 631, and 633 are illustrated as separate devices, a single disk storage device may be used to store any and all of the program instructions, measurement data, and results as desired.

In one embodiment, seismic data from hydrophones are stored in disk storage device 631. The system computer 630 may retrieve the appropriate data from the disk storage device 631 to perform the interval velocity estimation according to program instructions that correspond to the methods described herein. The program instructions may be written in a computer programming language, such as C++, Java and the like. The program instructions may be stored in a computer-readable memory, such as program disk storage device 633. Of course, the memory medium storing the program instructions may be of any conventional type used for the storage of computer programs, including hard disk drives, floppy disks, CD-ROMs and other optical media, magnetic tape, and the like.

According to the preferred embodiment of the invention, the system computer 630 presents output primarily onto graphics display 627, or alternatively via printer 628. The system computer 630 may store the results of the methods described above on disk storage 629, for later use and further analysis. The keyboard 626 and the pointing device (e.g., a mouse, trackball, or the like) 625 may be provided with the system computer 630 to enable interactive operation.

The system computer 630 may be located at a data center remote from the survey region. The system computer 630 is in communication with hydrophones (either directly or via a recording unit, not shown), to receive signals indicative of the reflected seismic energy. These signals, after conventional formatting and other initial processing, are stored by the system computer 630 as digital data in the disk storage 631 for subsequent retrieval and processing in the manner described above. While FIG. 6 illustrates the disk storage 631 as directly connected to the system computer 630, it is also contemplated that the disk storage device 631 may be accessible through a local area network or by remote access. Furthermore, while disk storage devices 629, 631 are illustrated as separate devices for storing input seismic data and analysis results, the disk storage devices 629, 631 may be implemented within a single disk drive (either together with or separately from program disk storage device 633), or in any other conventional manner as will be fully understood by one of skill in the art having reference to this specification.

While the foregoing is directed to embodiments of the present invention, other and further embodiments of the invention may be devised without departing from the basic scope thereof, and the scope thereof is determined by the claims that follow.

What is claimed is:

1. A method for estimating velocity in a subsurface region comprising:
   receiving seismic data for the subsurface region;
   calculating a distribution of one or more moveouts from one or more velocities of an initial velocity distribution;
   generating, using a microprocessor, a posterior distribution representing one or more probabilities of one or more velocities for the one or more moveouts;
   determining a velocity with uncertainty for the subsurface region based on the posterior distribution; and
   determining a pore pressure with uncertainty based on the velocity with uncertainty.

2. The method of claim 1, wherein the velocity with uncertainty is determined using a Monte Carlo method.

3. The method of claim 1, further comprising:
   determining a minimum stress with uncertainty based on the velocity with uncertainty; and
   designing a well based on the pore pressure with uncertainty and the minimum stress with uncertainty.

4. The method of claim 1, wherein generating the posterior distribution comprises:
   determining an uncertainty of the moveouts;
   determining one or more parameters with uncertainty that describe the one or more moveouts;
   receiving modeling data for the subsurface region;
   determining prior interval parameters distribution, based on the modeling data;
   determining a likelihood distribution representing one or more probabilities of the one or more moveouts for each of the one or more velocities; and
   multiplying the prior interval parameters distribution by the likelihood distribution to generate the posterior distribution.

5. The method of claim 4, wherein the uncertainty of the moveouts is determined using a semblance analysis.

6. The method of claim 4, wherein the one or more parameters with uncertainty comprise:
   tomographic velocity;
   root mean square average velocity;
   anisotropy;
   zero offset time; or
   combinations thereof.

7. The method of claim 4, wherein one or more prior interval parameters of the prior interval parameters distribution comprise:
   tomographic velocity;
   root mean square average velocity;
   anisotropy;
   zero offset time; or
   combinations thereof.

8. The method of claim 4, wherein the modeling data is obtained from surrounding wells.

9. The method of claim 4, wherein determining the prior interval parameter distribution comprises determining a probability distribution representing one or more probabilities for the one or more velocities for a given depth in the subsurface region.

10. The method of claim 4, wherein the one or more parameters with uncertainty are determined using numerical methods.

11. A non-transitory computer-readable medium comprising program instructions executable by a processor to:
   receive seismic data for a subsurface region;
   calculate a distribution of one or more moveouts from one or more velocities of an initial velocity distribution;
   generate a posterior distribution representing one or more probabilities of one or more velocities for the one or more moveouts;
   determine a velocity with uncertainty for the subsurface region based on the posterior distribution; and
   determine a pore pressure with uncertainty based on the velocity with uncertainty.

12. The non-transitory computer-readable medium of claim 11, wherein the velocity with uncertainty is determined using a Monte Carlo method.

13. The non-transitory computer readable medium of claim 11, further comprising program instructions executable by the processor to:
   determine a minimum stress with uncertainty based on the velocity with uncertainty; and
   design a well based on the pore pressure with uncertainty and the minimum stress with uncertainty.

14. The non-transitory computer readable medium of claim 11, wherein the posterior distribution is generated by program instructions executable by a processor to:
   determine an uncertainty of the moveouts;
   determine one or more parameters with uncertainty that describe the one or more moveouts;
   receive modeling data for the subsurface region;
   determine prior interval parameters distribution, based on the modeling data;
   determine a likelihood distribution representing one or more probabilities of the one or more moveouts for each of the one or more velocities; and
   multiply the prior interval parameters distribution by the likelihood distribution to generate the posterior distribution.

15. The non-transitory computer-readable medium of claim 14, wherein the uncertainty of the moveout is determined using a semblance analysis.

16. The non-transitory computer-readable medium of claim 14, wherein the one or more parameters with uncertainty comprise:
   tomographic velocity;
   root mean square average velocity;
   anisotropy;
   zero offset time; or
   combinations thereof.

17. The non-transitory computer-readable medium of claim 14, wherein the modeling data is obtained from surrounding wells.

18. The non-transitory computer-readable medium of claim 14, wherein determining the prior interval parameters distribution comprises determining a probability distribution representing one or more probabilities for the one or more velocities for a given depth in the subsurface region.

19. A computer system, comprising:
   a processor;
   a memory comprising program instructions executable by the processor to:
   receive seismic data for a subsurface region;
   calculate a distribution of one or more moveouts from one or more velocities of an initial velocity distribution;
   generate a posterior distribution representing one or more probabilities of one or more velocities for the one or more moveouts;
   determine a velocity with uncertainty for the subsurface region based on the posterior distribution; and
   determine a pore pressure with uncertainty based on the velocity with uncertainty.

20. The computer system of claim 19, further comprising program instructions executable by the processor to:
   determine a minimum stress with uncertainty based on the velocity with uncertainty; and
   design a well based on the pore pressure with uncertainty and the minimum stress with uncertainty.

* * * * *